United States Patent
Miller

(10) Patent No.: US 7,466,771 B2
(45) Date of Patent: *Dec. 16, 2008

(54) BLOCK EDGE EFFECTS IN ITERATIVE DIVERSITY RECEPTION

(75) Inventor: Mark Miller, San Diego, CA (US)

(73) Assignee: ViaSat Inc., Carlsbad, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/354,595

(22) Filed: Feb. 14, 2006

(65) Prior Publication Data

US 2006/0182203 A1 Aug. 17, 2006

Related U.S. Application Data

(60) Provisional application No. 60/653,071, filed on Feb. 14, 2005.

(51) Int. Cl.
*H04L 27/06* (2006.01)
*H04B 1/10* (2006.01)

(52) U.S. Cl. .................................. 375/340; 375/348

(58) Field of Classification Search ................. 375/259, 375/262, 267, 340, 341, 346, 347, 348; 714/746, 714/752, 758, 774, 786, 794–796
See application file for complete search history.

(56) References Cited

U.S. PATENT DOCUMENTS

| | | | |
|---|---|---|---|
| 5,978,365 A | 11/1999 | Yi | |
| 6,094,427 A | 7/2000 | Yi | |
| 6,611,513 B1 * | 8/2003 | ten Brink | 370/342 |
| 7,203,893 B2 * | 4/2007 | Kerr et al. | 714/780 |
| 7,206,364 B2 * | 4/2007 | Miller | 375/341 |
| 2001/0004390 A1 | 6/2001 | Pukkila et al. | |
| 2002/0115463 A1 | 8/2002 | Gatherer et al. | |
| 2003/0236081 A1 | 12/2003 | Braun | |
| 2005/0053173 A1 * | 3/2005 | Egnor et al. | 375/341 |
| 2005/0058224 A1 * | 3/2005 | Alagha et al. | 375/316 |
| 2005/0086570 A1 | 4/2005 | Ariyoshi | |
| 2005/0180364 A1 | 8/2005 | Nagarajan et al. | |
| 2005/0193308 A1 | 9/2005 | Shin | |
| 2006/0159187 A1 | 7/2006 | Wang et al. | |
| 2006/0182203 A1 | 8/2006 | Miller | |
| 2006/0182210 A1 | 8/2006 | Miller | |
| 2007/0009012 A1 * | 1/2007 | Carrivan et al. | 375/144 |

* cited by examiner

*Primary Examiner*—Don N Vo
(74) *Attorney, Agent, or Firm*—Townsend and Townsend and Crew LLP

(57) ABSTRACT

Methods, apparatuses, and systems are presented for deriving data from a composite signal by processing multiple blocks of symbols, involving (a) receiving a composite signal comprising contributions from a plurality of individual signals transmitted over different paths and representing a common data sequence, (b) calculating soft values of a first type taking into account the received composite signal and soft values of a second type, (c) generating symbol outputs taking into account the soft values of the first type, (d) calculating soft values of the second type taking into account the symbol outputs, (e) feeding back soft values of the second type, (f) iteratively updating soft values of the first type, symbol outputs, and soft values of the second type by repeating previous steps, and (g) deriving data using the updated symbol outputs, wherein multiple blocks of symbols are so processed, and adjacent blocks of symbols partially overlap one another.

31 Claims, 11 Drawing Sheets

BLOCK EDGE EFFECTS IN ITERATIVE DIVERSITY RECEPTION

CROSS-REFERENCES TO RELATED APPLICATIONS

This application claims the benefit of and is a non-provisional of U.S. patent application Ser. No. 60/653,071 filed on Feb. 14, 2005, which is assigned to the assigner hereof and hereby expressly incorporated by reference in its entirety for all purposes.

BACKGROUND OF THE INVENTION

Traditional path diversity schemes take advantage of diversity associated with signals transmitted over multiple paths, to improve the performance of a communication system. Information originating from a single data source can be intentionally or unintentionally propagated over multiple paths before arriving at a destination receiver. Typically, the propagation of a signal over the multiple paths causes different "versions" of the signal to arrive at the receiver at different time offsets, and at approximately the same frequency. The multiple paths may occur due to signal reflections, may occur due to delays attributable to one or more signal processing devices, such as repeaters, interposed between the transmitter and receiver, or due to some combination of physical paths and delays through signal processing devices. The difference in time of arrival associated with the different signal paths increases as the physical distances traversed by multiple signal paths increase. The receiver may be able to benefit from the existence of such multiple paths, or path diversity, if the receiver is able to properly process each of the delayed versions of the transmitted signal.

Techniques that take advantage of path diversity are well known and practical to implement for systems in which the maximum difference in time of arrival is on the order of 10 symbol intervals or less. Specifically, the optimum demodulator of a multipath signal is the well known Maximum Likelihood Sequence Estimation, which is commonly implemented using the Viterbi Algorithm. This approach is practical when the difference in the path delays between the paths is a relatively small number of symbols, e.g., $<\approx 10$, but is unpractical for scenarios such as that depicted in FIG. 1 where the differential path delay can be thousands of symbols in duration. Another approach is the classic RAKE receiver, which is also well known to those of ordinary skill in the art. The RAKE receiver provides a good approximation to the optimal receiver when the signal to noise ratio (SNR) is very low, e.g., $<\approx -6$ dB. For this reason, the RAKE receiver is commonly used with spread spectrum signals, such as code division multiple access (CDMA) signals. But for higher SNR environments that are common in non-spread spectrum applications, the RAKE receiver is ineffective. Thus, traditional path diversity schemes have been limited in their application.

For example, for communication systems involving non spread spectrum signals transmitted over multiple paths that have significant differences in their time of arrival, such traditional path diversity schemes are inadequate. These include systems that handle signals sent from a single transmitter over multiple paths, as well as systems that handle signals sent from distinct transmitters over multiple paths. Thus, there is an important need for techniques that allow generating and processing of multiple path diversity, co-frequency signals, especially in cases where the delay spread between the diversity paths is large relative to the symbol period.

BRIEF SUMMARY OF THE INVENTION

The present invention relates to methods, apparatuses, and systems for deriving data from a composite signal by processing multiple blocks of symbols, involving (a) receiving a composite signal comprising contributions from a plurality of individual signals transmitted over different paths, the plurality of individual signals being used to represent a common data sequence such that each of the individual signals corresponds to a data sequence that is a version of the common data sequence, (b) for each individual signal, calculating soft values of a first type over a block of symbols by taking into account the received composite signal and soft values of a second type, wherein for each symbol, a soft value of the first type is calculated for each possible symbol value of the symbol, (c) generating symbol outputs by taking into account the soft values of the first type from the different individual signals, (d) for each individual signal, calculating soft values of the second type over the block of symbols by taking into account the symbol outputs, wherein for each symbol, a soft value of the second type is calculated for each possible symbol value of the symbol, (e) feeding back the soft values of the second type for subsequent calculations of the soft values of the first type, (f) iteratively updating the soft values of the first type, the symbol outputs, and the soft values of the second type by repeating steps (b), (c), (d), and (e), (g) deriving data using the updated symbol outputs; and (h) wherein multiple blocks of symbols are so processed, and wherein adjacent blocks of symbols partially overlap one another.

In one embodiment, each block of symbols contains (B+k) symbols, B and k being positive integers, and adjacent blocks of symbols overlap by k symbols. For at least one of the plurality of individual signals, soft values of the first type for a group of k symbols in a current block of symbols may be calculated by utilizing soft values of the second type calculated in a previous block of symbols. For at least one of the plurality of individual signals, soft values of the first type for a group of k symbols in a current block of symbols may be set to a constant value indicating absence of soft values of the second type. For example, the constant value may equal to zero.

In another embodiment, each block of symbols contains (B+2k) symbols, B and k being positive integers, and adjacent blocks of symbols overlap by 2k symbols. For each individual signal, soft values of the first type may be calculated for (B+k) symbols in each block of symbols. For at least one of the plurality of individual signals, soft values of the first type for a first group of k symbols in a current block of symbols may be calculated by utilizing soft values of the second type calculated in a previous block of symbols. In an initial iteration, for the at least one of the individual signals, soft values of the first type for a second group of k symbols in the current block of symbols may be calculated by utilizing soft values of the second type calculated in the previous block of symbols. In subsequent iterations, for the at least one of the individual signals, soft values of the first type for the second group of k symbols in the current block of symbols may be calculated by taking into account soft values of the second type based on soft values of the first type for the first group of k symbols generated in a prior iteration.

DETAILED DESCRIPTION OF THE INVENTION

Illustrative Systems

Figure 1A:
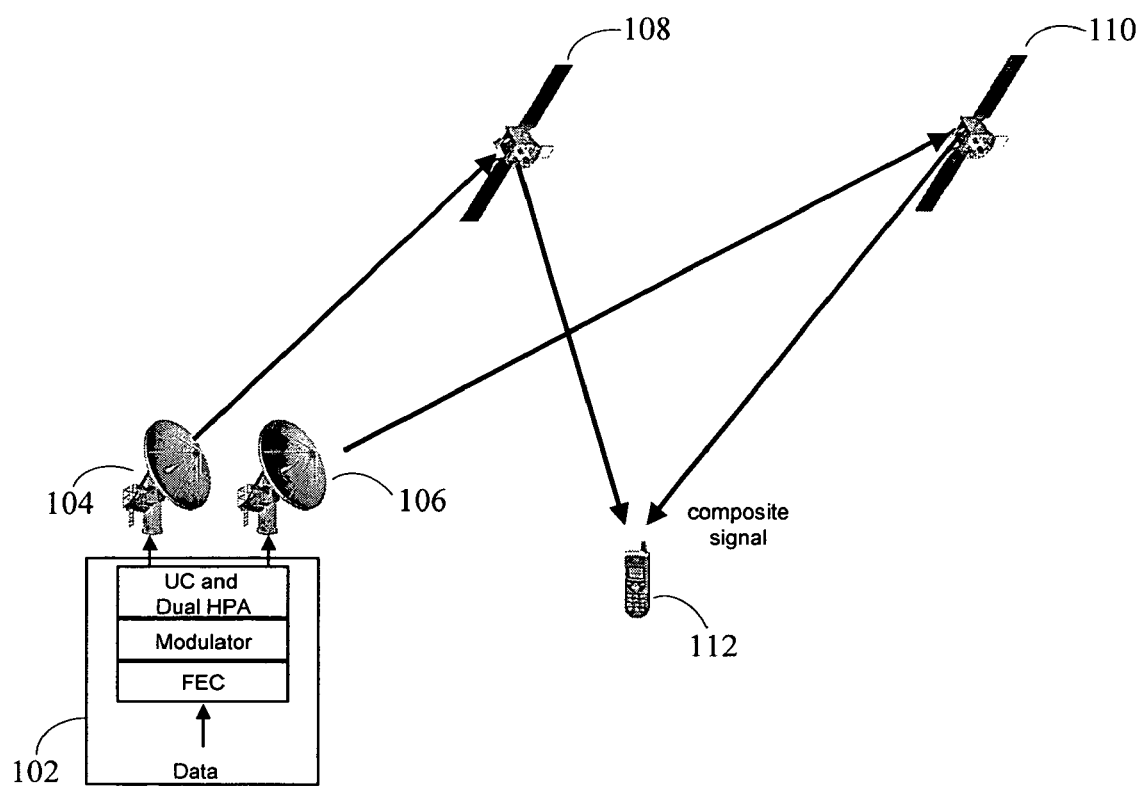
FIG. 1A is a diagram of an illustrative system which includes an Earth station simultaneously transmitting two signals representing a common data sequence using two antennas, via two separate satellites, the signals being received as a composite signal at a user terminal (UT), in accordance with an embodiment of the present invention.

FIG. 1A is a diagram of an illustrative system 100 which includes an Earth station 102 simultaneously transmitting two signals representing a common data sequence using two antennas 104 and 106, via two separate satellites 108 and 110, the signals being received as a composite signal at a user terminal (UT) 112, in accordance with an embodiment of the present invention. System 100 thus presents an example of a composite signal comprising contributions from a plurality of individual signals transmitted over different paths, wherein the individual signals are sent from different transmitters and received at a common receiver as a composite signal.

Earth station 102 is viewed here as the single data source. In the present embodiment of the invention, the data is encoded by a forward error correction (FEC) code. The encoded data is used as the common data sequence from which individual signals are generated. There are two individual signals generated in the present embodiment. To generate each individual signal, the common data sequence is optionally re-ordered according to a re-ordering function (described in more detail in subsequent sections) and modulated according to a suitable modulation scheme. In the present embodiment, an M-ary Phase Shift Keying (MPSK) modulation scheme is used. Thus, each individual signal is a modulated signal that represents the common data sequence originating from Earth station 102. The two resulting modulated signals are separately upconverted to a suitable radio frequency (RF) and amplified using high power amplifiers (HPA). The two upconverted, amplified signals are then separately transmitted using antennas 104 and 106, to satellites 108 and 110, respectively. The encoding, modulation, upconversion, and amplification of the two individual signals can be implemented using known techniques familiar to those of ordinary skill in the art.

In the present embodiment of the invention, the two satellites 108 and 110 are non-processing "bent pipe" satellites in low, medium or geo-synchronous orbits, each satellite being in a distinct orbit slot. Satellites 108 and 110 relay the individual signals from antennas 104 and 106 using the same nominal downlink frequency so the signals arrive at user terminal 112 at the same frequency, exclusive of any Doppler shift or satellite frequency translation error which is not common between all paths. These separate signals thus generally tend to interfere with each other. However, if the signals at the receiver can be properly processed, the diversity paths can be used to increase the signal to noise ratio and improve the link performance.

User terminal 112 may be implemented as one of a variety of different type of devices, such as a handheld device, a vehicle mounted terminal, or a fixed Earth station. Here, user terminal 112 employs a single receive antenna with sufficient beamwidth to be pointed at all signal paths simultaneously, including the signal path from satellite 108 and the signal path from satellite 110. User terminal 112 processes the composite signal which comprises contributions from individual signals transmitted over the different paths to take advantage of path diversity and thereby improve link performance.

While two paths using two satellites are shown in the present embodiment (one path extending from antenna 104 via satellite 108 to user terminal 112, the other path extending from antenna 106 via satellite 110 to user terminal 112), more than two paths can certainly be used. For example, when L satellites are used, there may be L paths in the multipath channel, L being a positive integer that may be greater than two. Furthermore, the present invention is not necessarily limited to satellite communication applications, even though satellite systems are used here to illustrate various embodiments of the invention.

Figure 1B:
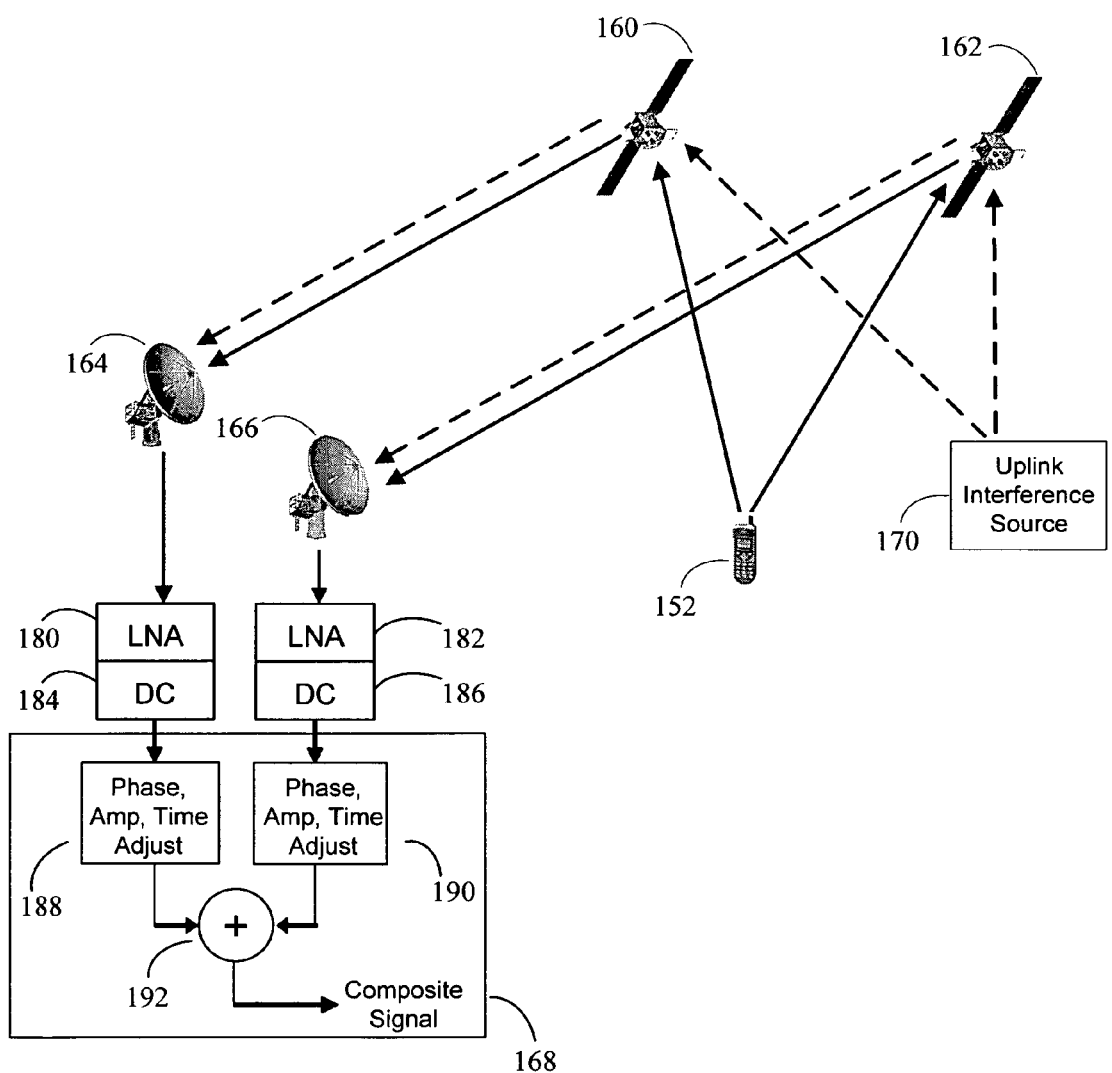
FIG. 1B is a diagram of an illustrative system which includes a user terminal (UT) transmitting a signal on different paths via two separate satellites, resulting in two signals being received at two separate antennas, wherein the signals are combined at an Earth station to form a composite signal, in accordance with an embodiment of the present invention.

FIG. 1B is a diagram of an illustrative system 150 which includes a user terminal (UT) 152 transmitting a signal on different paths via two separate satellites 160 and 162, resulting in two signals being received at two separate antennas 164 and 166, wherein the signals are combined at an Earth station 168 to form a composite signal, in accordance with an embodiment of the present invention. System 150 thus presents an example of a composite signal comprising contributions from a plurality of individual signals transmitted over different paths, wherein the individual signals are sent from a common transmitter and received initially at different receivers, subsequently combined, and then received as a composite signal.

System 150 presents a technique that can be used for canceling out undesired interference signals by adding received signals together. Here, the desired signals (shown in solid lines) are transmitted from user terminal 152, over multiple paths via satellites 160 and 162, to antennas 164 and 166. Undesired interference signals (shown in dotted lines) are transmitted from an interfering user terminal 170, over multiple paths via satellites 160 and 162, to antennas 164 and 166. The undesired interference uses the same transmission frequency as the desired signal. The desired signals and interference signals arrive at antennas 164 and 166 of Earth station 168 at the same frequency. Thus, the signal received at antenna 164 from satellite 160 has both a desired component and an interferer component. Similarly, the signal received at antenna 166 from satellite 162 has both a desired component and an interferer component.

Earth station 168 processes these two received signals from antennas 164 and 166 and combines them such that their interferer components cancel each other out. Specifically, Earth station 168 adjusts the relative phase, relative timing, relative amplitude, and possibly other attributes of the two received signals from antennas 164 and 166 such that their respective interferer components are 180 degrees out of phase and equal in magnitude. Thus, when the two received signals are combined, their respective interferer components cancel each other out (by destructive interference). What remains is a composite signal that is substantially free of the interference from user terminal 170. This composite signal is thus comprised of contributions from a plurality of individual signals transmitted over different paths, wherein the individual signals are sent from a common, desired transmitter, which is user terminal 152. The composite signal can then be processed using the innovative path diversity approaches described in various embodiments of the present invention.

In one embodiment of the invention, the equipment associated with Earth station 168 comprises low noise amplifiers (LNA) 180 and 182, down converters (DC) 184 and 186, parameter adjustment (Phase Amp Time Adjust) blocks 188 and 190, and signal combiner 192. LNA 180 amplifies the signal received from antenna 164. DC 184 down converts this amplified signal. Phase Amp Time Adjust block 188 performs proper phase, amplitude, and time adjustments to the down-converted signal. The resulting signal is presented to one input of signal combiner 192. Similar processing is performed on the signal received from antenna 166, using LNA 182, DC 186, Phase Amp Time Adjust block 190, to generate a resulting signal that is presented to the other input of signal combiner 192. Processing described above adjusts the two resulting signals such that their interferer components are of equal magnitude and 180 degrees out of phase. Combiner 192 then adds the two signals together so that their interferer components cancel each other out.

With the interference signals canceled out, user terminal 152 can be viewed here as the single data source associated with the desired individual signals. In the present embodiment of the invention, the desired data is encoded at user terminal 152 by a forward error correction (FEC) code. The encoded data is modulated according to a suitable modulation scheme. In the present embodiment, an M-ary Phase Shift Keying (MPSK) modulation scheme is used. The resulting modulated signal is upconverted to a suitable radio frequency (RF), amplified, and transmitted to satellites 160 and 162, respectively. The encoding, modulation, upconversion, and amplification can be implemented using known techniques familiar to those of ordinary skill in the art.

As in the case of system 100, here the two satellites 160 and 162 of system 150 are non-processing "bent pipe" satellites in low, medium or geo-synchronous orbits, each satellite being in a distinct orbit slot. Satellites 160 and 162 relay the signal from user terminal 152, along with the undesired signals from interferer user terminal 170, using the same nominal downlink frequency so the signals arrive antennas 164 and 166 at the same frequency, exclusive of any Doppler shift which is not common between all paths. According the present embodiment of the invention, the undesired signals from interferer user terminal 170 are canceled out with one another at Earth station 168. Further, the desired signals from user terminal 152 are processed at Earth station 168 to take advantage of path diversity and thereby improve link performance.

Again, while the desired signals are shown to be transmitted over two paths using two satellites in the present embodiment (one path extending from user terminal 152 via satellite 160 to antenna 164; the other path extending from user terminal 152 via satellite 162 to antenna 166), more than two paths can certainly be used. For example, when L satellites are used, there may be L paths in the multipath channel, L being a positive integer that may be greater than two.

For a system such as cooperative satellite system 100 or 150, the difference in the path delays between various paths can be many milliseconds, even more than 10 milliseconds. For a carrier with even a medium symbol rate of 1 mega symbols per second (Msps), the time arrival difference between paths can be thousands of symbols in duration. The techniques described herein allows path diversity to be exploited even when delay spread between the diversity paths is large relative to the symbol period.

Figure 2:
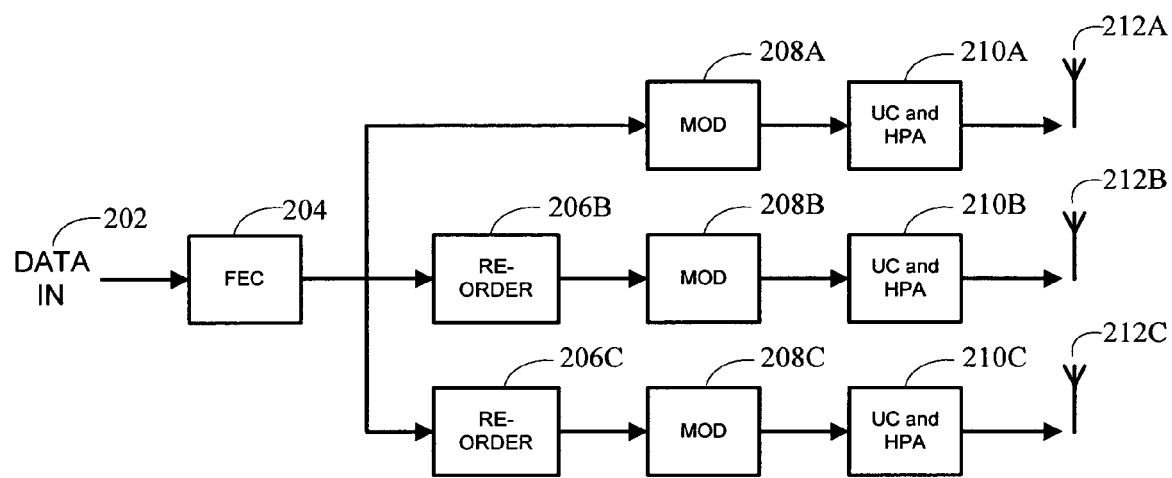
FIG. 2 is a basic block diagram of an example transmitter structure suitable for generating a plurality of individual signals that can be transmitted over different paths, according to one embodiment of the present invention.

FIG. 2 is a basic block diagram of an example transmitter structure 200 suitable for generating a plurality of individual signals that can be transmitted over different paths, according to one embodiment of the present invention. The plurality of individual signals represent a common data sequence such that each individual signal corresponds to a version of the common data sequence. While FIG. 2 illustrates an example where three individual signals are generated, the number of individual signals can be a number other than three. That is, transmit structure 200 can be implemented to generate L individual signals, where L is any positive integer. For example, referring back to FIG. 1A, transmitter structure 200 may be configured in Earth station 102 to generate two individual signals, which are transmitted by antennas 104 and 106.

As shown in FIG. 2, transmitter structure 200 comprises a forward error correction encoder (FEC) 204, a set of re-order blocks (RE-ORDER) 206B-C, a set of modulators (MOD) 208A-C, a set of upconverter and high power amplifiers (UC and HPA) 210A-C, and a set of outputs 212A-C. Operations of the various components of transmitter structure 200 is described in further detail below. An input 202 accepts a data sequence to be processed by transmitter structure 200. Input 202 may be implemented in different ways. For example, input 202 may comprise a digital interface to a data source, such as a buffer (not shown).

Here, FEC encoder 204 encodes the data sequence to produce an encoded data sequence. The encoded data sequence is used as a common data sequence to generate individual data sequences, each of which is a "version" of the common data sequence. One method of generating these individual data sequence is by using optional re-order blocks 206B-C. If implemented, each of the re-order blocks 206B-C re-orders the encoded sequence according to a known re-ordering function, to generate a differently re-ordered sequence. Alternatively, no re-ordering is performed, in which case the individual signals remain ordered in the same way. Even if no re-ordering is applied, the individual signals can later become offset in time from one another as they are transmitted over different paths and experience different path delays.

Returning to FIG. 2, the individual data sequences are then modulated using modulators 208A-C to produce individual modulated signals. The modulated signals are separately upconverted and amplified using UP and HPA 210A-C, then transmitted using separate transmitters 212A-C. As shown here, transmitters 212A-C are implemented as separate antennas.

Note that a plurality of individual signals used to represent a common data sequence need not be explicitly generated as separate signals. Transmitter structure 200 may be modified such that it generates only one modulated signal. Such a transmitter structure 200 would only comprise, for example, input 202, FEC 204, MOD 208A, UP and HPA 210A, and transmitter 212A. The single modulated signal generated from such a transmitter structure 200 may be sent over multiple paths, and in the process, become a plurality of individual signals. Each of these individual signals would represent the common data sequence. These individual signals may arrive at a receiver at different time offsets because they experience different path delays. Such a transmitter structure for generating a single modulated signal may be implemented in user terminal 152 shown in FIG. 1B.

Figure 3:
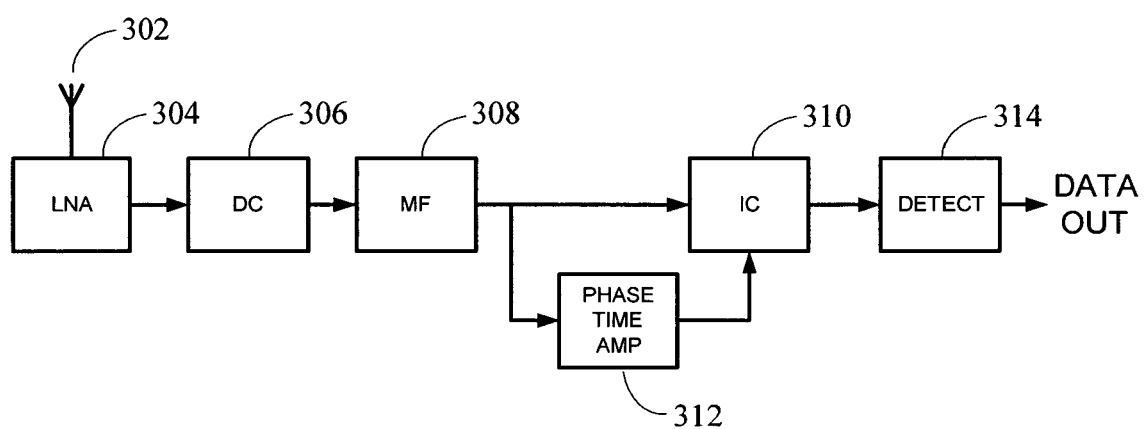
FIG. 3 is a basic block diagram of an example receiver structure suitable for processing a composite signal comprising contributions from individual signals transmitted over multiple paths, according to one embodiment of the present invention.

FIG. 3 is a basic block diagram of an example receiver structure 300 suitable for processing a composite signal comprising contributions from individual signals transmitted over multiple paths, according to one embodiment of the present invention. Referring back to FIG. 1A, receiver structure 300 may be implemented in user terminal 112 to process the composite signal received from satellites 108 and 110. As another example, referring back to FIG. 1B, portions of receiver structure 300 may be implemented in Earth station 168 to process the composite signal generated from the combining of signals received from satellites 160 and 162.

As shown in the figure, receiver structure 300 comprises a low noise amplifier (LNA) 304, a down converter (DC) 306, a match filter (MF) 308, an iterative combiner (IC) 310, a processing block (PHASE TIME AMP) 312, and a data detector (DETECT) 314. Operations of the various components of receiver structure 300 is described in further detail below. An input 302 accepts a composite signal to be processed by receiver structure 300. Input 302 may be implemented in different ways. Here, input 302 is shown as an antenna receiving the composite signal. In other implementations, input 302 may simply be a port through which the composite signal is delivered from another device. Low noise amplifier 304 amplifies the composite signal. Down convert 306 brings the signal down to baseband. The signal, now complex, is filtered by an appropriate match filter 308 and sampled at the rate of once per symbol. The result is a sampled complex output z(n), which is presented to iterative combiner 310 and also presented to processing block 312.

Processing block 312 estimates the phase, time, and amplitude of the various signal path components. The phase and amplitude estimates are represented as $w_l$'s, while the time estimates are represented as $\tau_l$'s in discussions that follow. For a composite signal comprising contributions from L individual signals transmitted over different paths, processing block 312 generates an estimate of $w_l$ and an estimate of $\tau_l$ for each one of the L individual signals. Processing block 312 can be implemented in numerous ways. For example, one technique would be to use an autocorrelation of the received signal and the differently received components will appear as correlation peaks separated in time by the delay spread of the received signal components.

Iterative combiner 310 uses the $w_l$'s and $\tau_l$'s generated by processing block 312 to process the sampled complex output z(n), to produce estimates of the received sequence. Finally, the estimates of the received sequence can be used by detector 314 to create the data stream out of the receiver. Operations of receiver structure 300, especially those of iterative combiner 310 and detector 314, are described in more detail in subsequent sections.

Received Signal Model

A received signal model is described below to further illustrate the operations of receiver 300 shown in FIG. 3. Here, well known technology areas of M-ary Phase Shift Keying (MPSK) modulation and satellite communication are adopted. However, it should be understood that different modulation schemes and different types of communication medium may be used in implementing the present invention. An initial symbol sequence a(n) is used to generate individual signals transmitted over multiple paths. The initial symbol sequence a(n) may already be FEC encoded. For example, referring back to FIG. 2, the FEC encoding function may be performed by FEC block 204. Here, an MPSK system is adopted. Thus, each data symbol in a(n) takes on one of the M possible values [0, 1, 2, ..., M−1], wherein M is a positive integer. Each symbol is mapped on to a constellation point on the I-Q plane ã(n) using a symbol mapping, such as the sequential mapping $$\tilde{a}(n) \exp\left(j 2\pi \frac{a(n)}{M}\right) \tag{1}$$

Other mapping, such as Gray coding, could also be used for mapping symbol values to constellation points.

Individual signals generated in this fashion may be transmitted over L different paths (e.g., L satellites) and received at a receiver as a composite signal. Facilities such as low noise amplifier 304 and down converter 306 of receiver structure 300 may perform appropriate low noise amplification and down conversion on the composite signal. Thus, according to the present embodiment of the invention using L paths and MPSK modulation, a mathematical model for the received composite signal r(t) is expresses as $$r(t) = A \sum_{n=-\infty}^{\infty} [w_0 \tilde{a}(n) p(t - nT) + w_1 \tilde{a}(n) p(t - nT - \tau_1) + \tag{1a}$$
$$\ldots + w_{L-1} \tilde{a}(n) p(t - nT - \tau_{L-1})] + n(t)$$

where p(t) is the pulse shaping which can be a Square Root Raised Cosine (SRRC) pulse shape, $w_l$ is complex value which represents the amplitude and phase, possibly time varying, of the $l^{th}$ path (l=0 ... L−1), and $\tau_l$ is the additional time delay of the $l^{th}$ path with respect to path number 0. Path number zero is defined to be the path with the minimum propagation delay. The channel phase and amplitude coefficients, $w_l$, are assumed here to be known values. According to an embodiment of the invention, these coefficients can be separately determined via conventional methods well known to one of ordinary skill in the art. For example, coefficients $w_l$ and $\tau_l$ may be determined by PHASE TIME AMP processing block 312 of receiver structure 300.

To simplify the explanation of iterative combining, the discussion below initially assumes that the path delay differences, $\tau_l$ are equal to an integer number of symbol periods. That is $\tau_l = k_l T$, where $k_l$ is some positive integer. Note that in satellite systems, this assumption may only hold in certain scenarios. For example, the assumption would hold if the diversity paths were through the same satellite, possibly in different spot beams. This would have utility, for example, for a UT in an area that was in the overlap area of two or more spot beams from the same satellite. In such a case, two signals will experience the exact same delay profile and thus have the potential to destructively interfere with each other if they happen to be received 180 degrees out of phase. The interference can be simply avoided by offsetting the two signals in time, and in this case, the delay can be selected to be exactly an integer number of symbols. However, in the general satellite case where the L paths come from L satellites in L different orbit slots, the assumption that time delays are equal to an integer number of symbol periods may not hold. The processing described in the subsequent sections extends the combiner utility to the general case where $\tau_l \neq k_l T$.

Using a matched filter receiver and assuming $\tau_l = k_l T$, the samples of the matched filter output can be expressed as $$z(n) = A[w_0 \tilde{a}(n) + w_1 \tilde{a}(n-k_1) + \ldots + w_{L-1} \tilde{a}(n-k_{L-1})] + N(n) \quad (2)$$

For example, z(n) may be the complex output generated from match filter 308 of receiver structure 300.

Iterative Combining

The relatively recent discovery (within the last 15 years) of Turbo codes and Iterative decoding provided the basis for applications of Iterative Processing in demodulation problems. Iterative Combining (IC) provides an attractive alternative in that it comes very close to the optimum MLSE solution but has reasonable complexity.

First, a sequence $a_l(n) = a(n-k_l)$ can be defined. In other words, $a_l(n)$ is the sequence of data symbols coming from the $l^{th}$ diversity path. Next we reformulate (2), $$z(n) = A[w_0 \tilde{a}_0(n) + w_1 \tilde{a}_1(n) + \ldots + w_{L-1} \tilde{a}_{L-1}(n)] + N(n) \quad (3)$$

where N is a complex Gaussian noise random variable with $E[N] = 0$ and $E[NN^*] = 2\sigma^2$. Note that the relationship between $a_0(n)$ and $a_l(n)$ in (3) need not be a simple time delay. A re-ordering of the sequence $a_0(n)$ to result in the sequence $a_l(n)$ can be used. For example, such re-ordering may be applied on the transmit side during generation of the individual signals, by using re-order blocks 206B-C shown in FIG. 2. This allows one to use re-ordered symbol sequences for the subsequent diversity paths.

Figure 4:
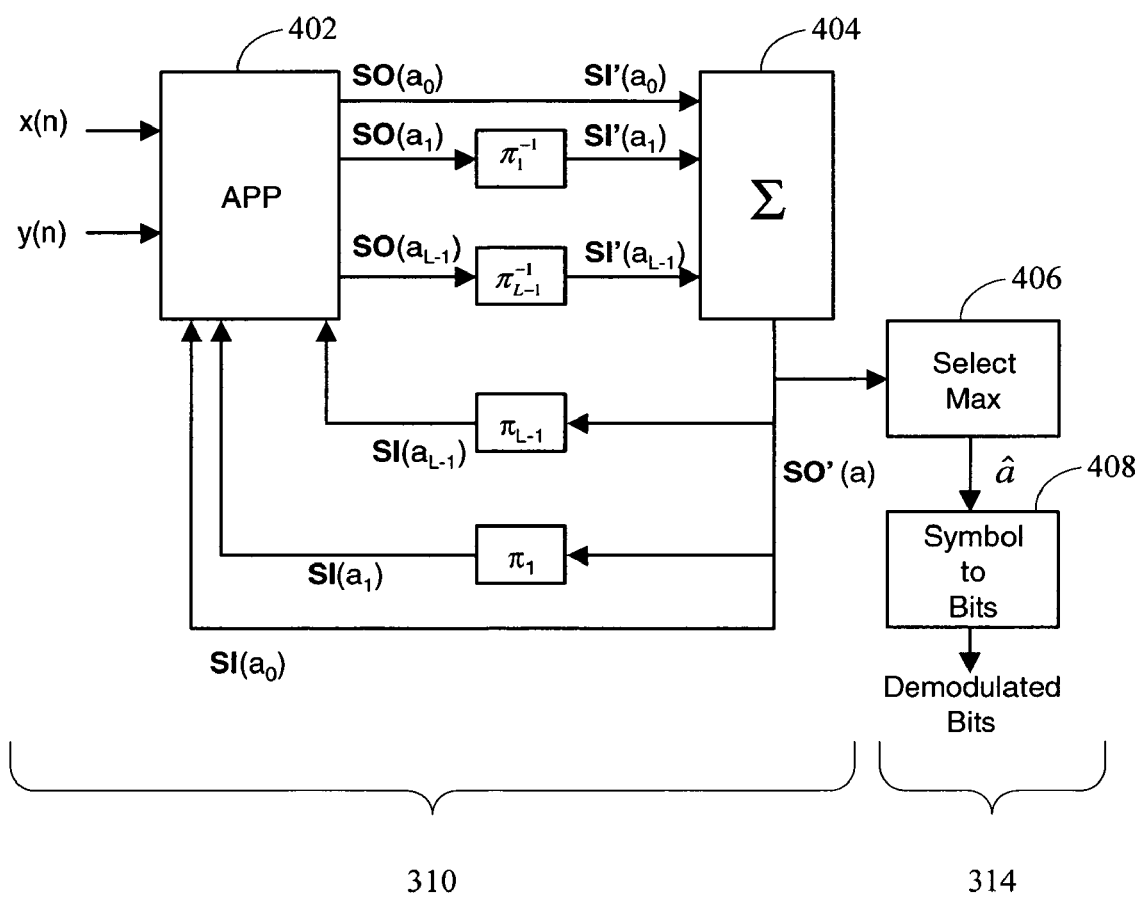
FIG. 4 is a block diagram depicting the operations of an iterative combiner and a data detector according to one embodiment of the invention.

FIG. 4 is a block diagram depicting the operations of iterative combiner 310 and data detector 314 according to one embodiment of the invention. Iterative combiner 310 comprises an A'Posteriori Probability calculator (APP) block 402, a summing block ($\Sigma$) 404, and various permutation and inverse permutation functions. Data detector 314 comprises a select maximum block 406 and a symbol-to-bit converter 408.

Iterative processing is performed over a block of B consecutive symbols. Ideally, the size of the block B is much larger than the difference (in symbols) between the smallest and largest path delays to reduce the edge effects to a minimum. The input time sequences, x(n) and y(n) are the real and imaginary parts of z(n). APP block 402 is a Soft Input-Soft Output (SISO) block that calculates the Soft Output (SO), also known as extrinsic information, of the symbol sequences $a_l(n)$ given the observation sequence z(n) and the Soft Input (SI), also known as the a'priori information, of the symbol sequences $a_l(n)$.

The a'posteriori soft outputs SO generated by APP block 402 are examples of soft values of a first type. The a'priori soft inputs SI received by APP 402 are examples of soft value of a second type.

In the present embodiment of the invention, the Soft Outputs SO are calculated without taking advantage of the known relationships between the sequences $a_l(n)$. In other words, the sequences $a_l(n)$ are treated as independent sequences by the APP block 402. The outputs of APP block 402 are the M dimensional vector sequences, $SO(a_l)$, which have M values for each time index, n. Specifically for the symbol at time n (the time index is omitted on the vector quantities for brevity), $$SO(a_l) = \begin{bmatrix} \ln[Pr\{a_l = 0 \mid z(n)\}] \\ \ln[Pr\{a_l = 1 \mid z(n)\}] \\ \vdots \\ \ln[Pr\{a_l = M-1 \mid z(n)\}] \end{bmatrix} - SI(a_l) \quad (4)$$

where $SI(a_l)$ is the vector of the log of the a'priori probabilities, $$SI(a_l) = \begin{bmatrix} \ln[Pr\{a_l = 0\}] \\ \ln[Pr\{a_l = 1\}] \\ \vdots \\ \ln[Pr\{a_l = M-1\}] \end{bmatrix} \quad (5)$$

It should be noted that in many implementations of APP block 402, the SI and SO information may contain an additive constant that is present in every component of (4) and (5). However, this may not affect the outcome of any symbol decisions because the information regarding the probabilistic likelihood of one symbol relative to another is carried within the differences between the components of the vector.

On the first iteration, the a'priori vectors SI are initialized by setting all of their components to the same constant value, such as 0, which indicates that all of the symbol values have a equal a'priori probability of occurrence.

The inverse permutations $\pi_l^{-1}$ take advantage of the known relationship between the symbols sequences $a_l(n)$ and $a_0(n)$. This relationship is generally $a_l(n) = a(n-k_l) = a_0(n-k_l)$ unless re-ordering of the symbols signal is performed. Reordering of the signals may be warranted for a number of reasons, including a desire to use different ordering on different satellites or spot beams.

When re-ordering of the symbols on paths 1 through L−1 is performed, the relationship between $a_l(n)$ and $a_0(n)$ is more than just a delay, but the relationship is still known. The inverse permutations, $\pi_l^{-1}$, can be configured to re-order the extrinsic vectors out of the APP such that the symbols sequences align. The permutations will in general remain fixed unless some sort of time dependent ordering of transmitted signals takes place. The values of the delays for each path, however, are subject to change with channel conditions and may need to be tracked and supplied to the Iterative Combiner. For example, PHASE TIME AMP processing block 312 shown in FIG. 3 may supply the delay information. After the inverse permutations $\pi_1^{-1}$ are applied, the result is the permuted extrinsic probability vectors labeled $SI'(a_l)$.

The permuted $SI'(a_l)$ values are example of aligned soft values of a first type. That is, they constitute a'posteriori information, but they have been aligned to take into account the permutations associated with the individual data sequences. Thus, the $SI'(a_l)$ values are symbol aligned. For each symbol a(n) on each of the L paths, the $SI'(a_l)$ values contain information about the likelihood that the transmitted symbol is equal to the each possible value $j, j \in [0, M-1]$. Here, the label SI' indicates that the vector is a soft input to the combing block as opposed to a soft input to the APP block, which is indicated by SI($a_l$).

The permuted SI'($a_l$) values are provided to summing block 404, which combines all of the information from the L paths by summing the components of all of the vectors, to generate the soft output vector SO'(a), $$SO'(a) = \sum_{l=0}^{L-1} SI'(a_l) \quad (5a)$$

The soft output of the summing block 404 is SO'(a). For each symbol a(n), SO'(a) contains information on the likelihood that the transmitted symbol is equal to each possible value j. These are examples of symbol soft outputs. SO'(a) is provided to select maximum block 406 to make a hard decision on the symbol a(n) by just choosing the index corresponding to the largest component of M components of the vector SO'(a), thereby producing symbol hard outputs (symbol decisions). The symbol hard outputs can be provided to symbol-to-bits converter 408 to generate bit hard outputs (bit decisions). That is, the demodulated bits are just the $\log_2(M)$ bits that are associated with the index corresponding to the symbol decisions.

For subsequent iterations, the vector time sequence SO'(a) is re-ordered by the permutations $\pi_l$ for l=1 to L−1. These permutations provide the same re-ordering that is performed by the combination of the transmitters and the channel delays. In other words, the symbol outputs generated by summing block 404 are re-aligned for each path such that they reflect the particular ordering of data sequences for that path. The vector sequence SO'(a) plus the L−1 re-ordered vector sequences form the soft input vector sequences, SI($a_l$). The SI($a_l$) values are now fed back to the APP block 402 for subsequent iterations.

The major calculation in the iterative decoder is the calculation of the APP soft output information as defined in (4). To express this calculation, first define the vector a which has as its components the symbols $a_0$, $a_1$, and $a_{L-1}$. The $j^{th}$ component of the soft output vector SO($a_l$) contains the information about the possibility that $a_l(n)=j$, and can be calculated using, $$SO(a_l = j) = \ln\left[\sum_{a:a_l=j} \exp\left\{\gamma[z(n), a] + \sum_{\substack{k=0 \\ k \neq l}}^{L-1} SI(a_k = f_k(a))\right\}\right] \quad (6)$$

In (6), the notation a: $a_l$=j indicates the sum over all possible values for the vector a constrained to the $l^{th}$ component, $a_l$, being equal to j. The vector a has L components, each with M possible values. So the vector a can assume $M^L$ possible values, but $l^{th}$ component of that vector is fixed, so the summation is over $M^{(L-1)}$ possible vector values. The term SI[$a_k$=$f_k(a)$] is the a'priori information on the possibility that $a_k$ equals the value $f_k(a)$ where $f_k(a)$ is the value of the $k^{th}$ component of the vector a. SI[$a_k$=$f_k(a)$] is just one of the components of the a'priori vector SI(a), the component is determined by the value of $a_k$ within the vector a. The term $\gamma(z(n),a)$ is computed from the channel inputs, z(n)

$$\gamma(z(n), a) = -\frac{(x(n) - \eta_x)^2 + (y(n) - \eta_y)^2}{2\sigma^2} \quad (7)$$

where $\eta_x$ and $\eta_y$ are the means given by, $$\eta_x = \mathrm{Re}\left\{A \sum_{l=0}^{L-1} w_l \cdot \tilde{a}_l(n)\right\} \quad (8)$$

$$\eta_y = \mathrm{Im}\left\{A \sum_{l=0}^{L-1} w_l \cdot \tilde{a}_l(n)\right\}$$

Note that in (7) the means are a function of the vector a.

The soft output of the APP block can also be computed in the log domain using the well known Max* function which is defined as, $$\mathrm{Max}^*(s,t) = \mathrm{Max}(s,t) + \ln(1 + e^{-|s-t|}) \quad (8a)$$

where Max(s,t) chooses the maximum value of s and t. The component of the APP soft output vector, SO($a_l$=j) can be then calculated by initializing a variable t to a large negative value and repetitively computing $$t = \mathrm{Max}*\left[t, \gamma(z(n), a) + \sum_{\substack{k=0 \\ k \neq l}}^{L-1} SI(a_k = f_k(a))\right] \quad (8b)$$

each time using a different value for the vector a, where the values are drawn from all possible values of a constrained to the $l^{th}$ component, $a_l$, being equal to j. After all $M^{(L-1)}$ possible values of a are applied in (8b) the variable t will contain the proper value for SO($a_l$=j).

Figure 5:
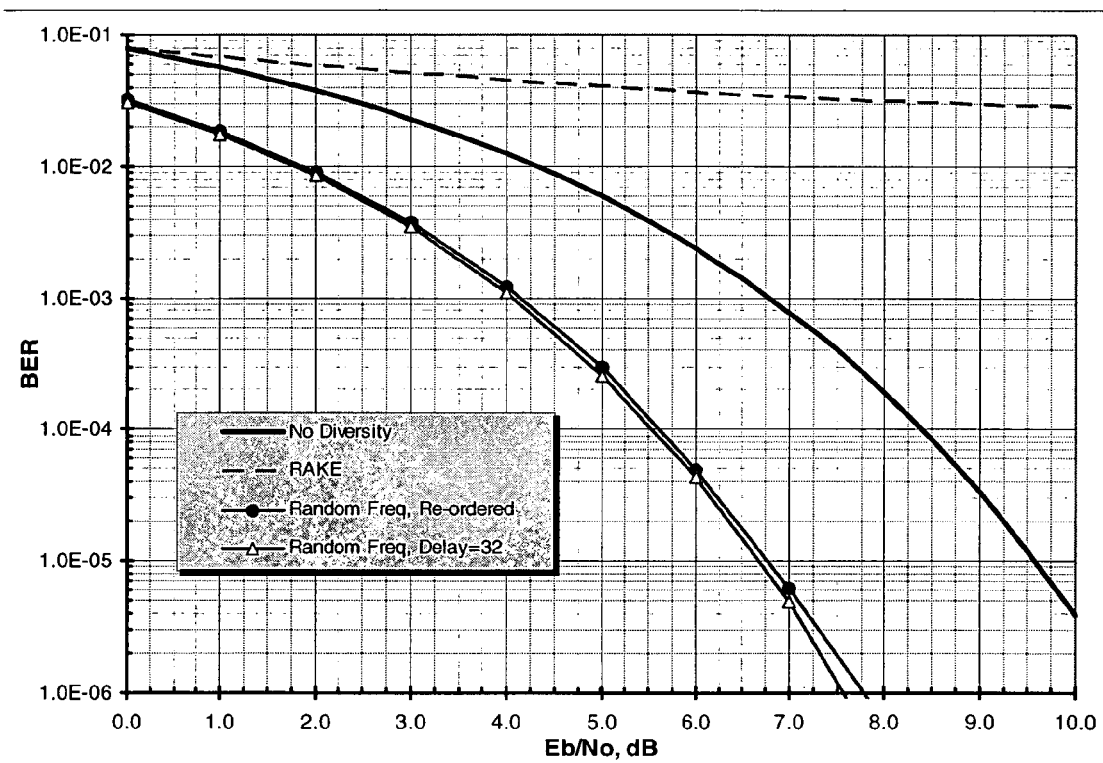
FIG. 5 presents simulated bit error rate (BER) performance for a variety of different reception scenarios, including performance of an iterative combiner configured in accordance with an embodiment of the invention.

FIG. 5 presents simulated bit error rate (BER) performance for a variety of different reception scenarios, including performance of an iterative combiner configured in accordance with an embodiment of the invention. Here, an iterative combiner using BPSK modulation and L=2 diversity paths is adopted. Here, convergence for the iterative combiner was achieved within 10 iterations. In other words, within 10 iterations of the calculations performed by the iterative combiner, such as those illustrated in FIG. 4, the marginal improvement in the BER performance associated with each additional iteration became insignificant. The first curve indicates the performance using only 1 path (no diversity). The performance with L=2 paths is shown for 2 cases: (1) one where the second path is a fixed delay of 32 symbols with respect to the first path and (2) another where the second path involves no delay but a re-ordering of the symbols in the first path. In both cases the received signal levels were the same and small random frequency error was introduced to simulate the small differences in received frequency of the two paths. As can be seen in FIG. 5, the performance with iterative combining is nearly 3 dB better than the no diversity case, and unlike the RAKE receiver, it performs very well at large SNRs.

Enhancement for Non-Integer Delays

Figure 6:
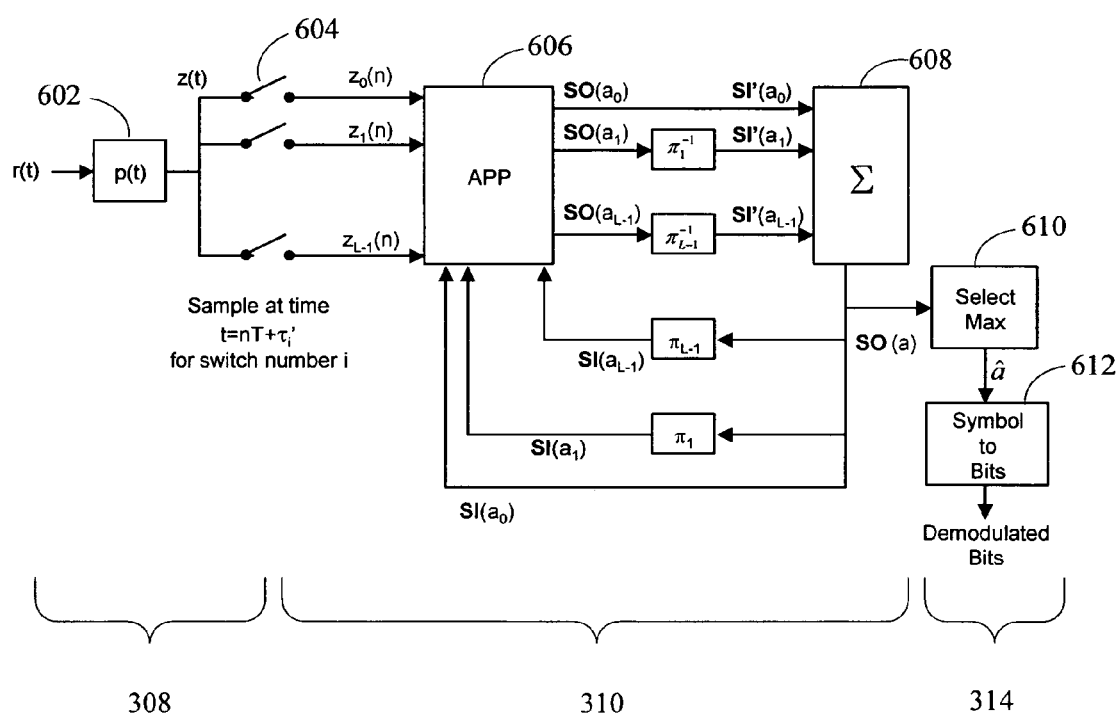
FIG. 6 is a block diagram depicting the operations of a match filter, an iterative combiner, and a data detector, as modified to accommodate non-integer path delays, according to one embodiment of the present invention.

FIG. 6 is a block diagram depicting the operations of match filter 308, iterative combiner 310, and data detector 314, as modified to accommodate non-integer path delays, according to one embodiment of the present invention. Here, match filter 308 comprises a filter 602 characterized by the pulse shape p(t) and a set of L samplers 604, which are described in further detail below. Iterative combiner 310 comprises APP block 606, summation block (Σ) 608, and various permutation and inverse permutation functions. Data detector 314 comprises select maximum block 610 and symbol-to-bit converter 612.

In the general case, the difference in the path delay between path number 1 and path number 0 may not be an integer number of symbols. Thus, the combing structure can be modified slightly to accommodate the non-integer path delays. As discussed previously, the input signal to the combiner is as described in equation (1). However, since the path delay differences are not integer multiples of the symbol duration, equation (2) does not hold. Instead, the signal out of the matched filter, and before sampling, is described by, $$z(t) = A \sum_{n=-\infty}^{\infty} [w_0 \tilde{a}(n) b(t - nT) + w_1 \tilde{a}(n) b(t - nT - \tau_1) + \ldots + w_{L-1} \tilde{a}(n) b(t - nT - \tau_{L-1})] + n(t) \quad (9)$$

where b(t) is the convolution of the pulse shape, p(t), with itself. This is accomplished by filtering the received signal r(t) with filter 602. The additional path delay values $\tau_l$ are generally quite large. They can be 1000's of symbols in duration. So we break the parameter $\tau_l$ into an integer part, $n_l$, and a fractional part, $\tau_l'$ ($0 \leq \tau_l' < T$). Thus $\tau_l = n_l T + \tau_l'$. Using this to re-write (9) yields, $$z(t) = A \sum_{n=-\infty}^{\infty} [w_0 \tilde{a}(n) b(t - nT) + w_1 \tilde{a}(n - n_1) b(t - nT - \tau_1') + \ldots + w_{L-1} \tilde{a}(n - n_{L-1}) b(t - nT - \tau_{L-1}')] + n(t) \quad (10)$$

Defining the symbols sequences $a_l(n) = a(n - n_l)$ results in a matched filter output that can be expressed as, $$z(t) = A \sum_{n=-\infty}^{\infty} [w_0 \tilde{a}_0(n) b(t - nT) + w_1 \tilde{a}_1(n) b(t - nT - \tau_1') + \ldots + w_{L-1} \tilde{a}_{L-1}(n) b(t - nT - \tau_{L-1}')] + n(t) \quad (11)$$

The output of the matched filter is then sampled L times to generate L sampled signals, $z_0(n) \ldots z_{L-1}(n)$. This is done by the set of samplers 604. The sample time for the $l^{th}$ time series, $z_l(n)$, is $t = nT + \tau_l'$. Each time series is thus sampled at the rate of one sample per symbol and is symbol synchronized to the symbol stream of one of the paths. The resulting time series that are used as input to the APP block are, $$z_l(n) = A \left[ w_l \cdot \tilde{a}_l(n) + \sum_{i \neq l} w_i \sum_{k=-\infty}^{\infty} \tilde{a}_i(k) \cdot b((n-k)T + \tau_l' - \tau_i') \right] + N_l(n) \quad (12)$$

In an alternative embodiment, the inputs to the APP block (Eq. 10) can be generated by a sampling of the signal r(t) at a sample rate higher than the sample rate and then performing digital matched filtering to generate matched filter outputs at a rate higher than the symbol rate. The high rate matched filter output sequence can that be digitally re-sampled to generate the sequences described in Eq. (12).

The APP block 606 works very similarly to that previous described. However, due to the Inter-Symbol Interference (ISI) that can be a result of the signals from the path delays not being symbol synchronized, Soft Input information from P symbols before and after symbol n must be used in the calculations. The parameter P is some small integer, typically 3 or less that is selected based on the width of the pulse b(t). The Soft Output information about the possibility that $SO(a_l(n)) = j$ is calculated by, $$SO(a_l(n) = j) = \ln \left[ \sum_{s \in S} \exp\{\gamma(z_l(n), s, l) + SI(s, l)\} \right] \quad (13)$$

where $$\gamma(z_l(n), s, l) = -\frac{(x_l(n) - \eta_x(s, l))^2 + (y_l(n) - \eta_y(s, l))^2}{2\sigma^2} \quad (14)$$

$$\eta_x(s, l) = \quad (15)$$

$$A \cdot \text{Re}\left\{ w_l \cdot \tilde{a}_l(n) + \sum_{\substack{k=0 \\ k \neq l}}^{L-1} w_k \sum_{m=n-P}^{n+P} \tilde{a}_k(m) \cdot b((n-m)T + \tau_l' - \tau_k') \right\}$$

$$\eta_y(s, l) =$$

$$A \cdot \text{Im}\left\{ w_l \cdot \tilde{a}_l(n) + \sum_{\substack{k=0 \\ k \neq l}}^{L-1} w_k \sum_{m=n-P}^{n+P} \tilde{a}_k(m) \cdot b((n-m)T + \tau_l' - \tau_k') \right\}$$

$$SI(s, l) = \sum_{\substack{k=0 \\ k \neq l}}^{L-1} \sum_{m=n-P}^{n+P} SI(a_k(m) = f_{k,m}(s)) \quad (16)$$

and s is a particular occurrence of values for the symbol vectors a(n−P) . . . a(n+P). The summation in (13) is performed over the space, S, which is defined by all possible combinations of symbol values for the components of the symbol vectors a(n−P) . . . a(n+P) which have influence on the means as defined by (15) except $a_l(n)$ which is always set to j. All components of the vector a(m) will have influence on (15) except the $l^{th}$ component, thus the sum in (13) will be performed $M^{(2P+1)(L-1)}$ possible symbol combinations. The function $f_{k,m}(s)$ specifies the symbol value for $k^{th}$ component of the symbol vector a(m) associated with s. This summation function is performed by summation block 608. All other processing in iterative combiner 310 and data detector 314 is the same as that which was previously presented with respect to FIG. 4.

Block Edge Effects

Figure 7A:
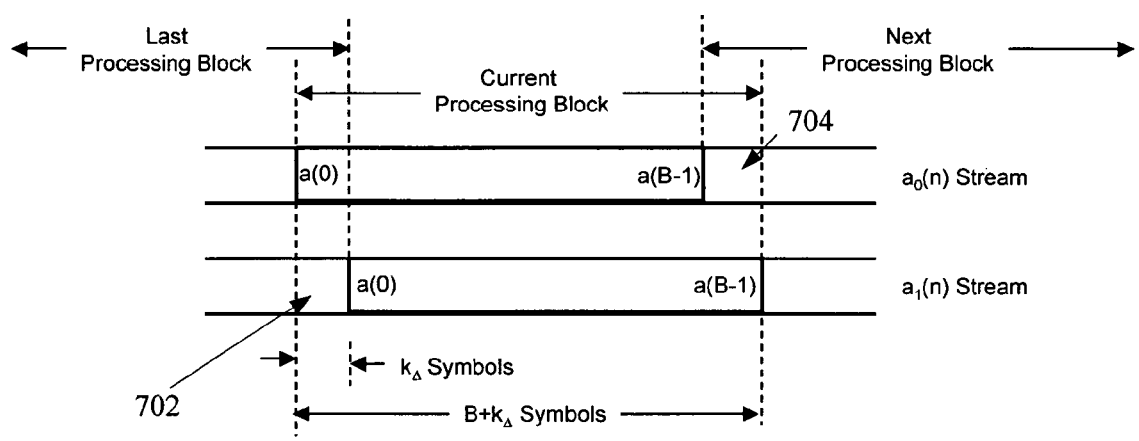
FIG. 7A illustrates the processing of overlapping blocks of symbols, each block comprising $B+k_A$ symbols, according to one embodiment of the invention.

FIG. 7A illustrates the processing of overlapping blocks of symbols, each block comprising $B + k_A$ symbols, according to one embodiment of the invention. Here, the iterative combiner forms Soft Outputs for a block of B consecutive symbols by processing a block of $B + k_A$ consecutive symbols. The value of $k_A$ is equal to or greater than the difference between the maximum and minimum path delays. In practice, a value of $k_A$ which is greater than maximum expected path delay difference is preferably selected. The next processing block will overlap the current processing block by $k_A$ symbols. The same processing occurs with the last processing block. FIG.

7A shows a diagram for L=2 satellites. A discussion of the block effects is provided for the case of L=2 but the concept is easily extended for L>2.

When computing the APP Soft Output information on the $a_0(n)$ stream, the symbols from the $a_I(n)$ stream represent interference to the $a_0(n)$ stream. The APP Soft Input information on the $a_I(n)$ stream is used to determine the APP Soft Output information on the $a_0(n)$ bits in the presence of the interference from the $a_I(n)$ stream. The terms APP Soft Output and APP soft input used here may indicate the Soft Output generated from APP block 606 and the Soft Inputs inputted to APP block 606, respectively, as shown in FIG. 6. Similarly, the term combined Soft Outputs used here may indicate the Soft Outputs generated from summing block 608 as shown in FIG. 6.

For the first $k_A$ bits of the $a_0(n)$ stream, the interference from the $a_I(n)$ stream (the symbols in the first overlapping section 702) are not part of the combined symbols $a(0) \ldots a(B-1)$, hence there is no Soft Input information available from the previous iteration of the combiner. However, information on the value of the symbols in overlapping section 702 was determined during the previous block. This information can be used as the required APP Soft Input information. The same information should be used for all iterations.

Similarly, when computing the APP Soft Output information for the last $k_A$ bits of the $a_I(n)$ stream, Soft Input information on the symbols in the second overlapping section 704 at the right of the $a_0(n)$ stream is required. Since these symbols occur after the $a(B-1)$ symbol in the $a_0(n)$ stream, the APP Soft Input information is not available at any time during the iterative combining of the current block. Nor is it available as a result of the processing of previous blocks. One should use APP Soft Input values of 0 (or any other constant) for each of the possible symbol values for the symbols in overlapping section 704. This indicates that all possible symbol values for the interfering symbols are equally likely.

Due to the unknown (and unknowable) nature of the values of the symbols in overlapping section 704, the APP Soft Outputs for the last $k_A$ symbols in the $a_I(n)$ stream will have a lower reliability to them than the other symbols. However, this information will be combined with the information on the same symbols from the $a_0(n)$ stream, which does not have a low reliability, to yield a significant improvement on the reliability of combined Soft Outputs for the symbols $a(B-k_I) \ldots a(B-1)$. Still the reliability of these symbols will be less than the reliability of combined Soft Outputs for symbols $a(0) \ldots a(B-k_I-1)$. Hence the value of selecting a processing block size, B, which is much larger than $k_A$.

Figure 7B:
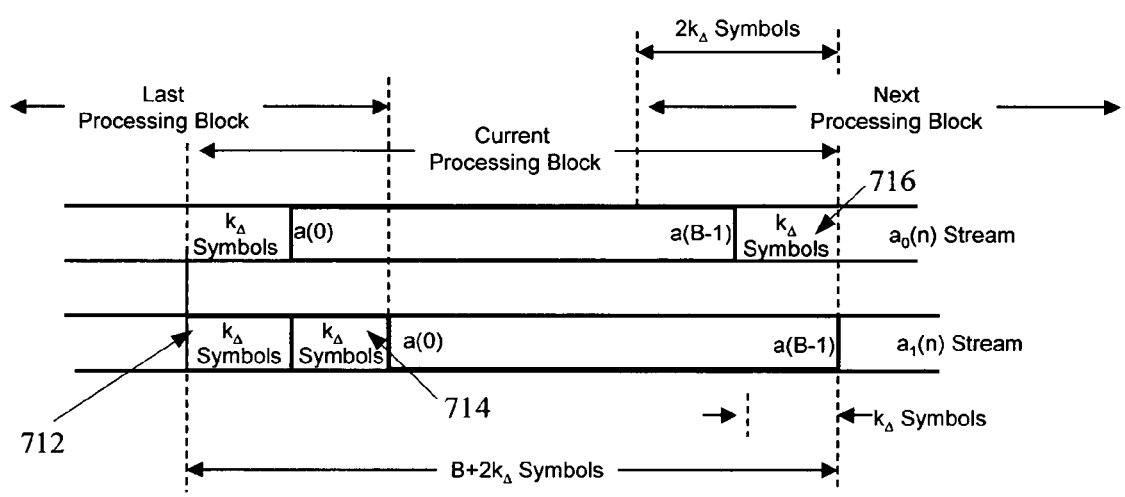
FIG. 7B illustrates the processing of overlapping blocks of symbols, each block comprising $B+2k_A$ symbols, according to an alternative embodiment of the invention.

FIG. 7B illustrates the processing of overlapping blocks of symbols, each block comprising $B+2k_A$ symbols, according to an alternative embodiment of the invention. Here, the lower reliability of the combined Soft Outputs for the last $k_A$ symbols of a processing block can be eliminated by using processing blocks with a size of $B+2k_A$ symbols and an overlap of $2k_A$ symbols.

As shown in FIG. 7B, the processing block starts $k_A$ symbols before the arrival $a_0(0)$ symbol. This allows the iterative combiner to generate combined Soft Outputs for the last $k_A$ symbols in the previous block as well as the B symbols in the current block. A total of $B+k_A$ combined Soft Outputs are generated for each processing block. Consecutive processing blocks will have an overlap of $k_A$ symbols in the combined Soft Outputs. The combined Soft Outputs for last $k_A$ symbols of the previous block, which have a reduced reliability as compared to the first $B-k_A$ symbols in the previous block, can be replaced with the combined Soft Outputs for the first $k_A$ symbols of the current block. A detailed explanation of the combiner operations is provided below.

The first $k_A$ symbols of the $a_0(n)$ stream in the current processing block will have, as interference, the $k_A$ symbols from the $a_I(n)$ stream labeled as section 712 in FIG. 7B. The combined Soft Outputs for these symbols have been generated in the previous processing block, and have maximum reliability since they are not the last $k_A$ symbols of the previous block. These combined Soft Outputs can be used as APP Soft Inputs for the $a_I(n)$ stream when computing the APP Soft Outputs for the first $k_A$ symbols of the $a_0(n)$ stream. The same APP Soft Input information should be used for all iterations.

The second set of $k_A$ symbols in the $a_0(n)$ stream will have, as interference, the $k_A$ symbols from the $a_I(n)$ stream which are labeled as section 714 in FIG. 7B. The combined Soft Output for these symbols from the previous processing block is used as APP Soft Inputs for first iteration of the APP Soft Output calculation of the $a_0(n)$ stream. Subsequent iterations of the combiner should use the Combined Soft Outputs for symbols of section 714 for the APP Soft Inputs, since the combiner now generates combined Soft Outputs for the $k_A$ symbols before the $a_0(0)$ symbols in the current block. The processing for the last $k_A$ symbols of the current block, labeled as section 716 in FIG. 7B, is identical to that which was previously described.

This method will result in combined Soft Outputs of maximum reliability for the first $B-k_A$ symbols of the current processing block as well as the combined Soft Outputs for the last $k_A$ of the previous processing block. The combined Soft Outputs for the last $k_A$ symbols of the current processing block will have a lesser reliability, but they will be replaced by the combined Soft Outputs for the first $k_A$ symbols of the next processing block.

Operation with Separate FEC Decoding

Figure 8:
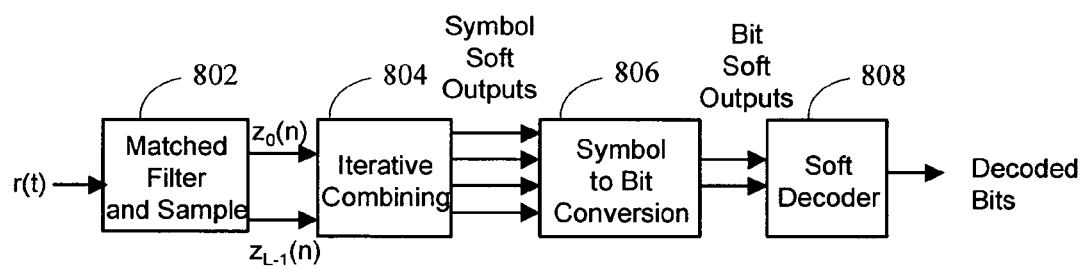
FIG. 8 presents a receiver structure that implements separate iterative combining and FEC decoding, in accordance with an embodiment of the invention.

FIG. 8 presents a receiver structure 800 that implements separate iterative combining and FEC decoding, in accordance with an embodiment of the invention. Receiver structure 800 comprises a matched filter and sampler 802, an iterative combiner 804, a symbol-to-bit converter 806, and an FEC soft decoder 808. The receiver structure 800 is configured to separate iterative combining functions from FEC decoding functions.

According to the present embodiment of the invention, iterative combiner 804 provides a soft output for each possible symbol value of a particular symbol. The output is generally related to the likelihood that the symbol takes on that particular value. Since it is common for FEC decoders to use soft decisions on the individual bits in the symbol, it may be necessary to provide a symbol soft output to soft bit output conversion to enable the cascade of a bit level decoder with the symbol level combiner. This is shown in FIG. 8 for QPSK operation. In this configuration, the decoder and combiner operate independently of one another. The FEC decoder may be any type of commonly used FEC decoder such as, but not limited to, convolutional decoder, block decoder or turbo (iterative) decoder.

In FIG. 8, the matched filter and sample block 802 takes the received baseband complex signal, r(t), and generates the sample stream into iterative combiner 804 as defined in (12). Iterative combiner 804 performs all iterations of the combining as described previously and then provides four soft outputs per symbol, one for each of the four possible symbol values (QPSK modulation is assumed here). The symbol-to-bit converter 806 takes the soft outputs for each of the 4 possible symbol values and generates soft decisions for each of the 2 bits in the QPSK signal. In other words, symbol-to-bit converter 806 converts symbol soft outputs to bit soft outputs. The bit soft outputs are then used as inputs to the FEC decoder. There is no feedback from the FEC decoder to the iterative combiner.

A possible algorithm that can be effectively used to generate the bit soft outputs is one that computes the log likelihood ratio (LLR) for each of the two bits in the QPSK symbol. The LLR of a bit b is defined as, $$LLR(b) = \ln\left[\frac{Pr\{b=1\}}{Pr\{b=0\}}\right] \quad (17)$$

Let the QPSK symbol, a, be identified by the 2 bit pattern $a=b^1b^0$. Additionally, the Soft Output information from the combiner is related to the log of the probability that the symbol takes on that particular value. That is, $$SO(a=j)=\ln[C \cdot Pr\{a=j\}] \quad (18)$$

where C is any positive value which is the same for all soft outputs associated with a symbol. Then, the LLR's for the bits $b^1$ and $b^0$ are well known and determined by, $$LLR(b^1)=\text{Max}^*[SO(a=2),SO(a=3)]-\text{Max}^*[SO(a=0), SO(a=1)]$$

$$LLR(b^0)=\text{Max}^*[SO(a=1),SO(a=3)]-\text{Max}^*[SO(a=0), SO(a=2)] \quad (19)$$

In (19), the symbol values a=2 and a=3 correspond to the bit value $b^1=1$ while the symbol values a=0 and a=1 correspond to the bit value $b^1=0$. Likewise, the symbol values a=1 and a=3 correspond to the bit value $b^0=1$ while the symbol values a=0 and a=2 correspond to the bit value $b^0=0$. Although the structure shown in FIG. 8 is described in terms of configuration and processing for QPSK, the extension to different alphabet sizes can be readily appreciated by one of ordinary skill in the art.

Operation with Integrated Iterative FEC Decoding

Figure 9:
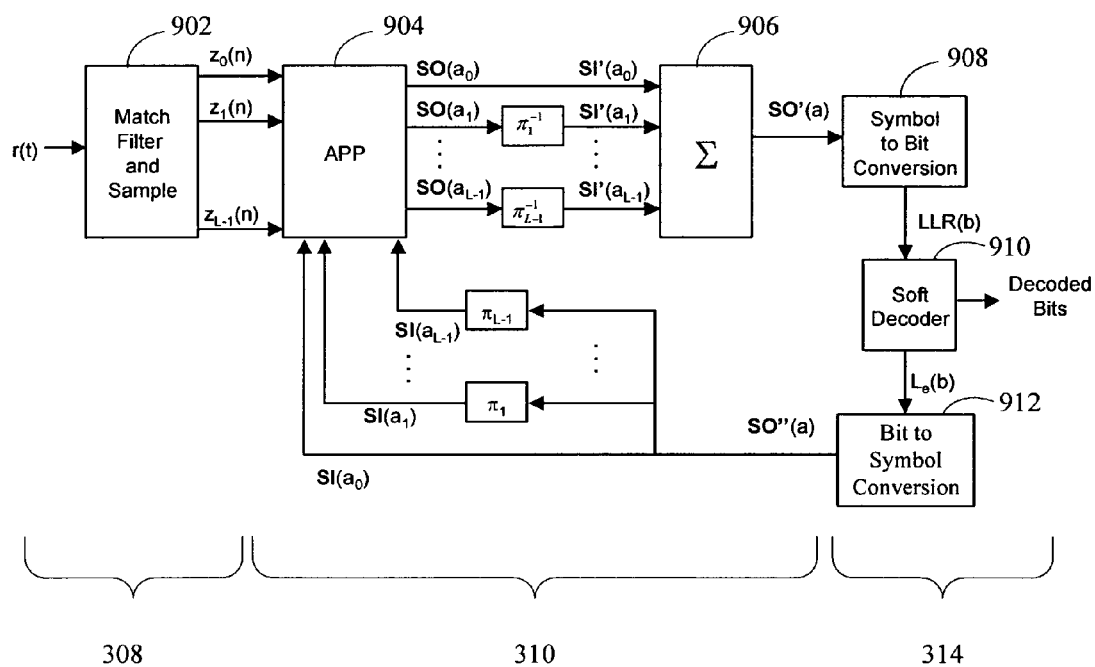
FIG. 9 is a block diagram depicting the operations of a match filter, an iterative combiner, and a data detector, as modified to implement integrated iterative combining and FEC decoding, in accordance with an embodiment of the present invention.

FIG. 9 is a block diagram depicting the operations of match filter 308, iterative combiner 310, and data detector 314, as modified to implement integrated iterative combining and FEC decoding, in accordance with an embodiment of the present invention. Here, match filter 308 comprises match filter and sampler 902. Iterative combiner 310 comprises APP block 904, summation block 906, and various permutation and inverse permutation functions. Data detector 314 comprises symbol-to-bit converter 908, soft FEC decoder 910, and symbol-to-bit converter 912. The structure shown in FIG. 9 is configured to integrate iterative combining functions with FEC decoding functions.

Accordingly, iterative combining can be integrated within the Iterative (Turbo) decoding structure of iterative (Turbo) decoder codes. Such codes include, but are not limited to, Parallel Concatenated Codes (PCC), Serial concatenated Codes (SCC), Low Density Parity Check Codes (LDPC), and Turbo Product Codes (TPC).

As shown in FIG. 9, matched filter and sample block 902 takes the received baseband complex signal, r(t), and generates the sample stream sent to iterative combiner 310 as defined in (12). Iterative combiner 310 uses these input samples and performs one iteration of the combining with all components of the soft inputs vectors $SI(a_0) \ldots SI(a_{L-1})$ initialized to 0 or some other constant. The output of iterative combiner 310 are the vectors SO'(a) (generated by summation block 906), one for each symbol in the block, whose components contain soft information related to the probability that the symbol, a, takes on the value j, j∈[0 ... M−1]. These values are symbol soft outputs.

Symbol-to-bit converter 908 converts the symbol soft outputs to bit soft outputs, such as log likelihood ratios (LLR's), for each of the $\log_2(M)$ bits within a symbol, using an algorithm such as previously described.

Soft FEC decoder 910 then performs one or more iterations and provides both decoded bits (as the decoder outputs) and extrinsic LLR information on each of the $\log_2(M)$ input bits associated with each of the symbols. The techniques to generate extrinsic information on the input bits for all types of iteratively decoded FEC codes are well know to those skilled in the art of Turbo decoding.

Bit-to-symbol converter 912 takes the extrinsic information on the bits, $L_e(b)$ and converts it to soft information on each of the symbols. In other words, decoded bit soft outputs are converted to decoded symbol soft outputs. These decoded symbol soft outputs are the vectors SO"(a), one for each symbol in the block, whose components contain soft information related to the probability that the symbol a takes on the value j, j∈[0 ... M−1].

A method for determining the bit-to-symbol soft information conversion is described below. Let possible value of the symbol a be identified by the $k=\log_2(M)$ bit pattern $b^{k-1} \ldots b^2b^1b^0$. Each of the $b^i$ in the pattern take on a value of 1 or 0. The soft information on the symbol a that the combiner desires is, $$SO''(a=b^{k-1} \ldots b^1b^0)=\ln(Pr\{a=b^{k-1} \ldots b^1b^0\})+C \quad (20)$$

where C is any value which is constant for all possible values of a. Let the LLR's out of the decoder for each of the bits $b^i$ be defined by $LLR(b^i)$. Then, the soft information is easily determined by, $$SO''(a=b^{k-1} \ldots b^1b^0) = \sum_{i=0}^{\log_2(M)-1} b^i \cdot LLR(b^i) \quad (21)$$

The soft information is computed for every possible symbol value a to yield the soft input vector, SO"(a).

Finally, The vectors SO"(a) are fed back into the blocks representing the iterative combiner 310. There, the vectors SO"(a) are permuted using the L−1 separate permutation patterns, $\pi_1 \ldots \pi_{L-1}$ and become the soft inputs, SI(a), for the second iteration of the combiner. This integrated process of 1 iteration of the combiner followed by 1 or more iterations of the decoder is repeated until the desired number of combining iterations is achieved.

The embodiments of the present invention presented above can be implemented in a wide variety of ways. The various functional blocks disclosed herein may be implemented using different facilities, such as hardware, software, a combination of hardware and software. For example, signal processing may be performed by dedicated hardware, programmable hardware, computer processor(s) carrying out programmed routines, etc. The format of signals may be changed to analog or digital form at various stages depending on the implementation.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for deriving data from a composite signal by processing multiple blocks of symbols, the method comprising:
   (a) receiving a composite signal comprising contributions from a plurality of individual signals transmitted over different paths, the plurality of individual signals being used to represent a common data sequence such that each of the individual signals corresponds to a data sequence that is a version of the common data sequence;
   (b) for each individual signal, calculating soft values of a first type over a block of symbols by taking into account the received composite signal and soft values of a second type, wherein for each symbol, a soft value of the first type is calculated for each possible symbol value of the symbol;
   (c) generating symbol outputs by taking into account the soft values of the first type from the different individual signals;
   (d) for each individual signal, calculating soft values of the second type over the block of symbols by taking into account the symbol outputs, wherein for each symbol, a soft value of the second type is calculated for each possible symbol value of the symbol;
   (e) feeding back the soft values of the second type for subsequent calculations of the soft values of the first type;
   (f) iteratively updating the soft values of the first type, the symbol outputs, and the soft values of the second type by repeating steps (b), (c), (d), and (e);
   (g) deriving data using the updated symbol outputs; and
   (h) wherein multiple blocks of symbols are so processed, and wherein adjacent blocks of symbols partially overlap one another.

2. The method of claim 1 wherein the individual signals are transmitted via satellites.

3. The method of claim 1 wherein the individual signals are sent from different transmitters and received at a common receiver as the composite signal.

4. The method of claim 1 wherein for an initial iteration of step (b), the soft values of the second type are set to a constant value.

5. The method of claim 1,
   wherein each block of symbols contains (B+k) symbols, B and k being positive integers; and
   wherein adjacent blocks of symbols overlap by k symbols.

6. The method of claim 5 wherein for at least one of the plurality of individual signals, soft values of the first type for a group of k symbols in a current block of symbols are calculated by utilizing soft values of the second type calculated in a previous block of symbols.

7. The method of claim 5 wherein for at least one of the plurality of individual signals, soft values of the first type for a group of k symbols in a current block of symbols are set to a constant value indicating absence of soft values of the second type.

8. The method of claim 7 wherein the constant value equals to zero.

9. The method of claim 1,
   wherein each block of symbols contains (B+2k) symbols, B and k being positive integers; and
   wherein adjacent blocks of symbols overlap by 2k symbols.

10. The method of claim 9 wherein for each individual signal, soft values of the first type are calculated for (B+k) symbols in each block of symbols.

11. The method of claim 9 wherein for at least one of the plurality of individual signals, soft values of the first type for a first group of k symbols in a current block of symbols are calculated by utilizing soft values of the second type calculated in a previous block of symbols.

12. The method of claim 11 wherein, in an initial iteration, for the at least one of the individual signals, soft values of the first type for a second group of k symbols in the current block of symbols are calculated by utilizing soft values of the second type calculated in the previous block of symbols.

13. The method of claim 12 wherein, in subsequent iterations, for the at least one of the individual signals, soft values of the first type for the second group of k symbols in the current block of symbols are calculated by taking into account soft values of the second type based on soft values of the first type for the first group of k symbols generated in a prior iteration.

14. The method of claim 1 wherein the symbol outputs are symbol soft outputs, wherein for each symbol, the symbol outputs comprise a soft value for each possible symbol value of the symbol.

15. A method for processing signals representing data comprising:
   generating a plurality of individual signals, the plurality of individual signals being used to represent a common data sequence such that each of the individual signals corresponds to a data sequence that is a version of the common data sequence;
   separately transmitting the plurality of individual signals over different paths;
   wherein a composite signal comprising contributions from the plurality of individual signals is being processed by performing the steps of
      (a) for each individual signal, calculating soft values of a first type over a block of symbols by taking into account the composite signal and soft values of a second type, wherein for each symbol, a soft value of the first type is calculated for each possible symbol value of the symbol;
      (b) generating symbol outputs by taking into account the soft values of the first type from the different individual signals;
      (c) for each individual signal, calculating soft values of the second type over the block of symbols by taking into account the symbol outputs, wherein for each symbol, a soft value of the second type is calculated for each possible symbol value of the symbol;
      (d) feeding back the soft values of the second type for subsequent calculations of the soft values of the first type;
      (e) iteratively updating the soft values of the first type, the symbol outputs, and the soft values of the second type by repeating steps (a), (b), (c), and (d);
      (f) deriving data using the updated symbol outputs; and
      (g) wherein multiple blocks of symbols are so processed, and wherein adjacent blocks of symbols partially overlap one another.

16. An apparatus for deriving data from a composite signal by processing multiple blocks of symbols, the apparatus comprising:
   an input adapted to accept composite signal comprising contributions from a plurality of individual signals transmitted over different paths, the plurality of individual signals being used to represent a common data sequence such that each of the individual signals corresponds to a data sequence that is a version of the common data sequence; and a receiver structure coupled to the input, the receiver structure adapted for iterative processing involving (a) for each individual signal, calculating soft values of a first type over a block of symbols by taking into account the received composite signal and soft values of a second type, wherein for each symbol, a soft value of the first type is calculated for each possible symbol value of the symbol;

(b) generating symbol outputs by taking into account the soft values of the first type from the different individual signals;

(c) for each individual signal, calculating soft values of the second type over the block of symbols by taking into account the symbol outputs, wherein for each symbol, a soft value of the second type is calculated for each possible symbol value of the symbol;

(d) feeding back the soft values of the second type for subsequent calculations of the soft values of the first type;

(e) iteratively updating the soft values of the first type, the symbol outputs, and the soft values of the second type by repeating steps (a), (b), (c), and (d);

(f) deriving data using the updated symbol outputs; and (g) wherein multiple blocks of symbols are so processed, and wherein adjacent blocks of symbols partially overlap one another.

17. The apparatus of claim 16 wherein the individual signals are transmitted via satellites.

18. The apparatus of claim 16 wherein the individual signals are sent from different transmitters and received at a common receiver as the composite signal.

19. The apparatus of claim 16 wherein for an initial iteration of step (a), the soft values of the second type are set to a constant value.

20. The apparatus of claim 16,
wherein each block of symbols contains (B+k) symbols, B and k being positive integers; and
wherein adjacent blocks of symbols overlap by k symbols.

21. The apparatus of claim 20 wherein for at least one of the plurality of individual signals, soft values of the first type for a group of k symbols in a current block of symbols are calculated by utilizing soft values of the second type calculated in a previous block of symbols.

22. The apparatus of claim 20 wherein for at least one of the plurality of individual signals, soft values of the first type for a group of k symbols in a current block of symbols are set to a constant value indicating absence of soft values of the second type.

23. The apparatus of claim 22 wherein the constant value equals to zero.

24. The apparatus of claim 16,
wherein each block of symbols contains (B+2k) symbols, B and k being positive integers; and
wherein adjacent blocks of symbols overlap by 2k symbols.

25. The apparatus of claim 24 wherein for each individual signal, soft values of the first type are calculated for (B+k) symbols in each block of symbols.

26. The apparatus of claim 24 wherein for at least one of the plurality of individual signals, soft values of the first type for a first group of k symbols in a current block of symbols are calculated by utilizing soft values of the second type calculated in a previous block of symbols.

27. The apparatus of claim 26 wherein, in an initial iteration, for the at least one of the individual signals, soft values of the first type for a second group of k symbols in the current block of symbols are calculated by utilizing soft values of the second type calculated in the previous block of symbols.

28. The apparatus of claim 27 wherein, in subsequent iterations, for the at least one of the individual signals, soft values of the first type for the second group of k symbols in the current block of symbols are calculated by taking into account soft values of the second type based on soft values of the first type for the first group of k symbols generated in a prior iteration.

29. The apparatus of claim 16 wherein the symbol outputs are symbol soft outputs, wherein for each symbol, the symbol outputs comprise a soft value for each possible symbol value of the symbol.

30. An apparatus for processing signals representing data comprising:

an input adapted to accept a common data sequence;

a transmitter structure coupled to the input, the transmitter structure is adapted to generate a plurality of individual signals, the plurality of individual signals being used to represent the common data sequence such that each of the individual signals corresponds to a data sequence that is a version of the common data sequence;

the transmitter structure further adapted to separately transmit the plurality of individual signals over different paths;

wherein a composite signal comprising contributions from the plurality of individual signals is adapted to be processed iteratively by (a) for each individual signal, calculating soft values of a first type over a block of symbols by taking into account the received composite signal and soft values of a second type, wherein for each symbol, a soft value of the first type is calculated for each possible symbol value of the symbol;

(b) generating symbol outputs by taking into account the soft values of the first type from the different individual signals;

(c) for each individual signal, calculating soft values of the second type over the block of symbols by taking into account the symbol outputs, wherein for each symbol, a soft value of the second type is calculated for each possible symbol value of the symbol;

(d) feeding back the soft values of the second type for subsequent calculations of the soft values of the first type;

(e) iteratively updating the soft values of the first type, the symbol outputs, and the soft values of the second type by repeating steps (a), (b), (c), and (d);

(f) deriving data using the updated symbol outputs; and (g) wherein multiple blocks of symbols are so processed, and wherein adjacent blocks of symbols partially overlap one another.

31. A system for deriving data from a composite signal by processing multiple blocks of symbols, the method comprising:

(a) means for receiving a composite signal comprising contributions from a plurality of individual signals transmitted over different paths, the plurality of individual signals being used to represent a common data sequence such that each of the individual signals corresponds to a data sequence that is a version of the common data sequence;

(b) means for, for each individual signal, calculating soft values of a first type over a block of symbols by taking into account the received composite signal and soft values of a second type, wherein for each symbol, a soft value of the first type is calculated for each possible symbol value of the symbol;

(c) means for generating symbol outputs by taking into account the soft values of the first type from the different individual signals;

(d) means for, for each individual signal, calculating soft values of the second type over the block of symbols by taking into account the symbol outputs, wherein for each symbol, a soft value of the second type is calculated for each possible symbol value of the symbol;

(e) means for feeding back the soft values of the second type for subsequent calculations of the soft values of the first type;

(f) means for iteratively updating the soft values of the first type, the symbol outputs, and the soft values of the second type by repeating steps (b), (c), (d), and (e);

(g) means for deriving data using the updated symbol outputs; and (h) wherein multiple blocks of symbols are so processed, and wherein adjacent blocks of symbols partially overlap one another.

* * * * *